(12) United States Patent
Armstrong et al.

(10) Patent No.: US 6,691,146 B1
(45) Date of Patent: Feb. 10, 2004

(54) LOGICAL PARTITION MANAGER AND METHOD

(75) Inventors: Troy David Armstrong, Rochester, MN (US); William Joseph Armstrong, Kasson, MN (US); Michael Joseph Corrigan, Rochester, MN (US); Naresh Nayar, Rochester, MN (US); Thomas Rembert Sand, Rochester, MN (US); Jeffrey Jay Scheel, Rochester, MN (US); Erik Tkal, Rochester, MN (US); Kenneth Charles Vossen, Kasson, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,214

(22) Filed: May 19, 1999

(51) Int. Cl.⁷ .......................... G06F 9/00; G06F 15/173
(52) U.S. Cl. ........................ 709/100; 709/329; 709/224
(58) Field of Search .................... 709/1, 100, 224, 709/301, 329, 310; 395/500; 710/5; 707/513

(56) References Cited

U.S. PATENT DOCUMENTS

| | | | |
|---|---|---|---|
| 3,641,505 A | 2/1972 | Artz et al. | 340/172.5 |
| 4,511,964 A | 4/1985 | Georg et al. | 364/200 |
| 4,601,008 A | 7/1986 | Kato | 364/900 |
| 4,843,541 A | 6/1989 | Bean et al. | 364/200 |
| 4,924,378 A | 5/1990 | Hershey et al. | 364/200 |
| 5,129,088 A | 7/1992 | Auslander et al. | 395/700 |
| 5,204,897 A | 4/1993 | Wyman | 380/4 |
| 5,253,344 A | 10/1993 | Bostick et al. | 395/275 |
| 5,263,158 A | 11/1993 | Janis | 395/600 |
| 5,297,287 A | 3/1994 | Miyayama et al. | 395/700 |
| 5,345,590 A | 9/1994 | Ault et al. | 395/650 |
| 5,365,514 A | 11/1994 | Hershey et al. | 370/17 |
| 5,375,206 A | 12/1994 | Hunter et al. | 395/200 |
| 5,446,902 A | 8/1995 | Islam | 395/700 |
| 5,465,360 A | 11/1995 | Miller et al. | 395/700 |
| 5,526,488 A | 6/1996 | Hershey et al. | 395/200.2 |
| 5,550,970 A | 8/1996 | Cline et al. | 395/161 |
| 5,566,337 A | 10/1996 | Szymanski et al. | 395/733 |
| 5,574,914 A | 11/1996 | Hancock et al. | 395/650 |
| 5,600,805 A | 2/1997 | Fredericks et al. | 395/825 |
| 5,659,756 A | 8/1997 | Hefferon et al. | 395/726 |
| 5,659,786 A | 8/1997 | George et al. | 395/653 |
| 5,671,405 A | 9/1997 | Wu et al. | 395/607 |
| 5,675,791 A | 10/1997 | Bhide et al. | 395/621 |

(List continued on next page.)

FOREIGN PATENT DOCUMENTS

| | | | |
|---|---|---|---|
| JP | 07-200492 | 8/1995 | |
| JP | 10-111797 | 4/1998 | |
| JP | 10-301795 | 11/1998 | |
| WO | WO9518998 | 7/1995 | G06F/1/24 |

OTHER PUBLICATIONS

Gomes, Lee. "Desktops to get OS freedom of choice", Wall Street Journal Online, Mar. 26, 1999.*

(List continued on next page.)

*Primary Examiner*—Zarni Maung
(74) *Attorney, Agent, or Firm*—Martin & Associates, LLC; Derek P. Martin

(57) ABSTRACT

A partition manager for managing logical partitions in a computer system includes hooks to low-level operating system code in one of the logical partitions. By using the operating system code to manage the resources of a computer system, any changes that are made to the operating system are automatically reflected in the function of the partition manager. In addition, low-level functions of operating systems, which are often well-debugged and tested, can be used when generating a new partition manager, greatly simplifying the time and reducing the cost of producing a partition manager.

27 Claims, 5 Drawing Sheets

U.S. PATENT DOCUMENTS

| | | | |
|---|---|---|---|
| 5,684,974 A | 11/1997 | Onodera | 395/412 |
| 5,687,363 A | 11/1997 | Oulid-Aissa et al. | 395/604 |
| 5,692,174 A | 11/1997 | Birely et al. | 395/603 |
| 5,692,182 A | 11/1997 | Desai et al. | 395/610 |
| 5,742,757 A | 4/1998 | Hamadani et al. | 395/186 |
| 5,784,625 A | 7/1998 | Walker | 395/733 |
| 5,819,061 A | 10/1998 | Glassen et al. | 395/406 |
| 5,828,882 A | 10/1998 | Hinckley | 395/680 |
| 5,845,146 A | 12/1998 | Onodera | 395/822 |
| 5,923,890 A | 7/1999 | Kubala et al. | 395/800.01 |
| 5,948,065 A | 9/1999 | Eilert et al. | 709/226 |
| 5,978,857 A * | 11/1999 | Graham | 709/301 |
| 5,996,026 A | 11/1999 | Onodera et al. | 710/3 |
| 6,021,438 A | 2/2000 | Duvvoori et al. | 709/224 |
| 6,061,695 A * | 5/2000 | Slivka et al. | 707/513 |
| 6,075,938 A * | 6/2000 | Bugnion et al. | 395/500.48 |
| 6,148,323 A | 11/2000 | Whitner et al. | 709/105 |
| 6,173,337 B1 | 1/2001 | Akhond et al. | 709/318 |
| 6,199,179 B1 | 3/2001 | Kauffman et al. | 714/26 |
| 6,247,109 B1 | 6/2001 | Kleinsorge et al. | 712/13 |
| 6,263,359 B1 | 7/2001 | Fong et al. | 709/103 |
| 6,269,391 B1 | 7/2001 | Gillespie | 709/100 |
| 6,269,409 B1 * | 7/2001 | Solomon | 709/329 |
| 6,279,046 B1 * | 8/2001 | Armstrong et al. | 710/5 |
| 6,282,560 B1 | 8/2001 | Eilert et al. | 709/100 |
| 6,496,847 B1 * | 12/2002 | Bugnion et al. | 709/1 |

OTHER PUBLICATIONS

VMWare 1.0.x for Linux Changelog Archive (1999).*

"Microsoft Computer Dictionary", Microsoft Press, 4th Edition, 1999.*

"S/390 Parallel Enterprise Server—Generation 3, S/390 Coupling Faciliy Model C04, System Overview," Publication GA22–7150–00, IBM Japan, 1997.

Hauser, "Does Licensing Require New Access Control Techniques?", Nov. 1994, Communications of the ACM, v37n11, pp. 84–55, dialog copy pp. 1–10.

McGilton et al., "Introducing the UNIX System," 1983, R.R. Donnelley & Sons Company, pp. 515–521.

Abstract for JAPIO Application No. 94–103092, T. Imada et al., Apr. 15, 1994, "Virtual Computer System."

Abstract for JAPIO Application No. 92–348434, T. Imada et al., Dec. 3, 1992, "Virtual Computer System."

Inspec Abstract No. C9408–6110P–022, A. B. Gargaro et al., Mar. 1994, "Supporting Distribution and Dynamic Reconfiguration in AdaPT."

VMWare Virtual Platform—Technology White Paper, http://vmware.com/products/virtualplatform.html (1999).

IBM Technical Disclosure Bulletin, Kreulen, "OS/2 Raw FileSystem," vol. 40, No. 05, pp. 177–190, May 1997.

IBM Technical Disclosure Bulletin, Baskey et al., "Highly Parallel Coupling Facility Emulator/Router with Shadowed Link Buffers," vol. 39, No. 12, pp. 123–124, Dec. 1996.

U.S. Patent Application RO999–021, "Apparatus and Method for Specifying Maximum Interactive Performance in a Logical Partition of a Computer System Independently from the Maximum Interactive Performance in Other Partitions," filed May 19, 1999, Armstrong et al.

U.S. Patent Application RO999–022, "Processor Reset Generated via Memory Access Interrupt," filed May 19, 1999, Armstong et al.

U.S. Patent Application RO999–023, "Management of a Concurrent Use License in a Logically–Partitioned Computer," filed May 19, 1999, Armstrong et al.

U.S. Patent Application RO999–024, "Event–Driven Communications Interface for Logically–Partitioned Computer," filed May 19, 1999, Armstrong et al.

* cited by examiner

LOGICAL PARTITION MANAGER AND METHOD

RELATED APPLICATIONS

This patent application is related to the following patent applications: U.S. patent application entitled "Apparatus and Method for Specifying Maximum Interactive Performance in a Logical Partition of a Computer System Independently from the Maximum Interactive Performance in Other Partitions," Ser. No. 09/314,541 filed May 19, 1999 by Armstrong et al.; U.S. patent application entitled "Processor Reset Generated via Memory Access Interrupt," Ser. No. 09/314,769 filed May 19, 1999 by Armstrong et al., now U.S. Pat. No. 6,467,007; U.S. patent application entitled "Management of a Concurrent Use License in a Logically-Partitioned Computer," Ser. No. 09/314,324 filed May 19, 1999 by Armstrong et al.; and U.S. patent application entitled "Event-Driven Communications Interface for Logically-Partitioned Computer," U.S. Pat. No. 6,279,046 issued on Aug. 21, 2002 to Armstrong et al.

BACKGROUND OF THE INVENTION

1. Technical Field

This invention generally relates to data processing, and more specifically relates to logical partitioning in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The AS/400 computer system developed by IBM is an example of a computer system that supports logical partitioning. If logical partitioning on an AS/400 is desired, partition manager code (referred to as a "hypervisor" in AS/400 terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

In a computer system with no logical partitions, a partition manager is not needed, and the operating system controls access to the computer system resources. In a computer system that has one or more logical partitions, the partition manager controls access to the computer system resources, and the operating systems installed in each logical partition uses the partition manager to perform its functions. Because both the operating system and the partition manager must be able to manage the resources in a computer system, the low-level functions of an operating system are typically implemented in a partition manager as well. In known systems, the partition manager is separate from the operating system, and the partition manager is generally maintained separately from the operating system. Because they share similar functions, a change to a common function in one will typically require a corresponding change in the other. Without a mechanism that supports logical partitioning in a more efficient manner, the programming of partition managers and the separate maintenance of operating systems and partition managers will continue to be a drain on resources in the computer industry.

DISCLOSURE OF INVENTION

According to the present invention, a partition manager for managing logical partitions in a computer system includes hooks to low-level operating system code in one of the logical partitions. By using the operating system code to manage the resources of a computer system, any changes that are made to the operating system are automatically reflected in the function of the partition manager. In addition, low-level functions of operating systems, which are often well-debugged and tested, can be used when generating a new partition manager, greatly simplifying the time and reducing the cost of producing a partition manager.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a computer system that supports logical partitioning includes a partition manager that uses hooks to an operating system in one of the logical partitions to accomplish the low-level control of the computer system. By using operating system functions, the size of the partition manager is greatly reduced, and the maintainability of the partition manager is significantly enhanced.

Figure 1:
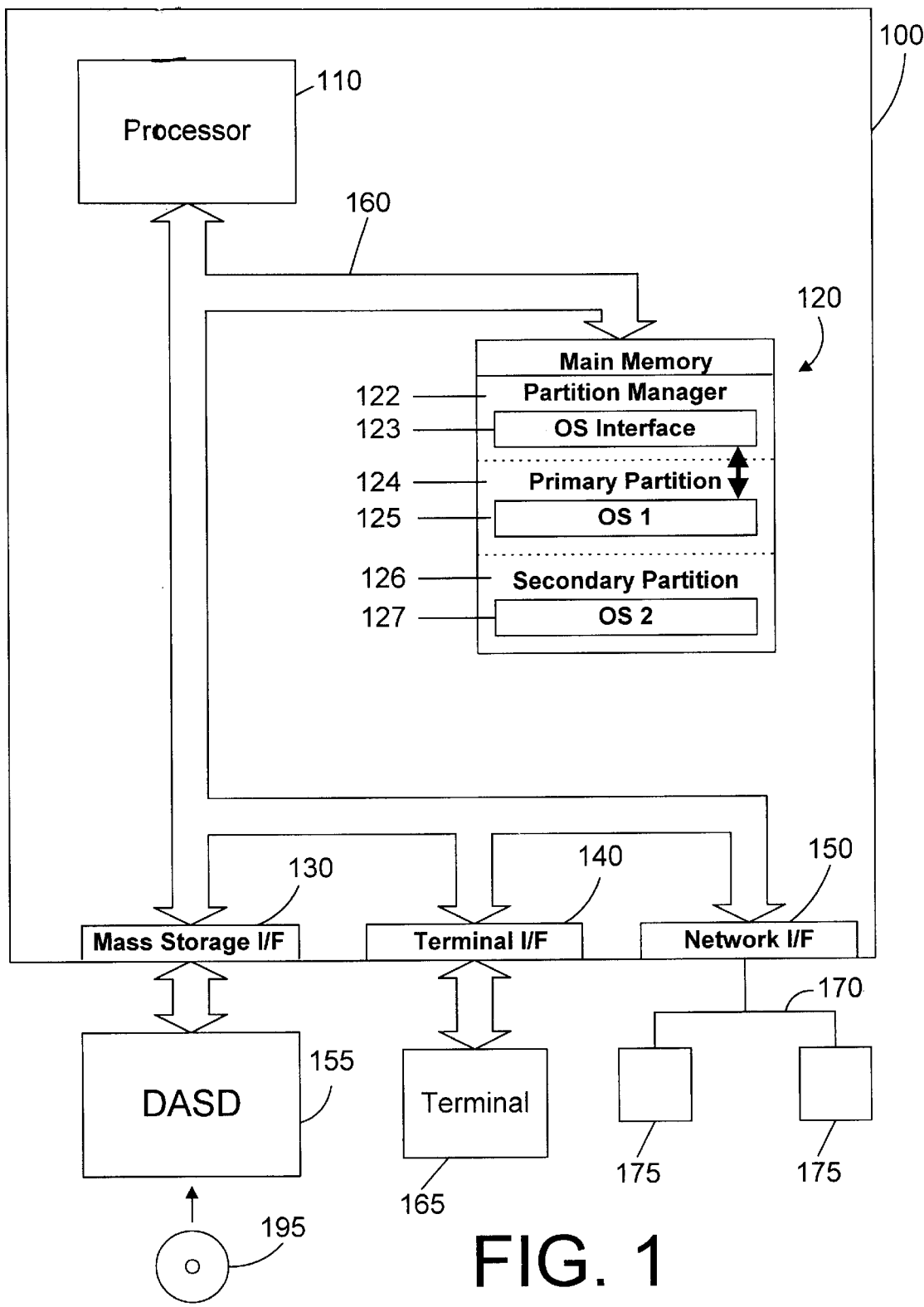
FIG. 1 is a block diagram of a computer apparatus that supports logical partitioning in accordance with the preferred embodiments.

Referring to FIG. 1, a computer system 100 is an enhanced IBM AS/400 computer system, and represents one suitable type of computer system that supports logical partitioning in accordance with the preferred embodiments. Those skilled in the art will appreciate that the mechanisms and apparatus of the present invention apply equally to any computer system that supports logical partitions. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a CD-ROM drive, which may read data from a CD-ROM 195.

Main memory 120 contains a partition manager 122 that manages a primary partition 124 and one or more secondary partitions 126, both of which are logical partitions. The primary partition 124 includes an operating system 125, and the secondary partition 126 includes an operating system 127. The partition manager 122 includes an interface 123 to the operating system 125 in the primary partition 124. In this manner the partition manager 122 uses code that already exists within operating system 125 instead of duplicating this code to perform its partition management functions.

Operating system 125 is a multitasking operating system known in the industry as OS/400; however, those skilled in the art will appreciate that the spirit and scope of the present invention is not limited to any one operating system. Any suitable operating system can be used. Operating system 125 is a sophisticated program that contains low-level code to manage the resources of computer system 100. Some of these resources are processor 110, main memory 120, mass storage interface 130, terminal interface 140, network interface 150, and system bus 160. The operating system 127 in each secondary partition 126 may be the same as the operating system 125 in the primary partition 124, or may be a completely different operating system. Thus, primary partition 124 can run the OS/400 operating system, while secondary partition 126 can run another instance of OS/400, possibly a different release, or with different environment settings (e.g., time zone). The operating system 127 in the secondary partition 126 could even be different than OS/400, provided it is compatible with the hardware and the operating system interface 123. In this manner the logical partitions can provide completely different computing environments on the same physical computer system.

The partitions 124 and 126 are shown in FIG. 1 to reside within the main memory 120. However, one skilled in the art will recognize that a partition is a logical construct that includes resources other than memory. A logical partition typically specifies a portion of memory, along with an assignment of one or more processors and other system resources. Thus, primary partition 124 could be defined to include two processors and a portion of memory 120, along with one or more I/O processors that can provide the functions of mass storage interface 130, terminal interface 140, network interface 150, or interfaces to other I/O devices. The secondary partition 126 could then be defined to include three other processors, a different portion of memory 120, and one or more I/O processors. The partitions are shown in FIG. 1 to symbolically represent logical partitions, which would include system resources outside of memory 120 within computer system 100.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 122 and the partitions 124 and 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 122, which initializes the operating systems in the logical partitions.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 195 of FIG. 1), and transmission type media such as digital and analog communications links.

Figure 2:
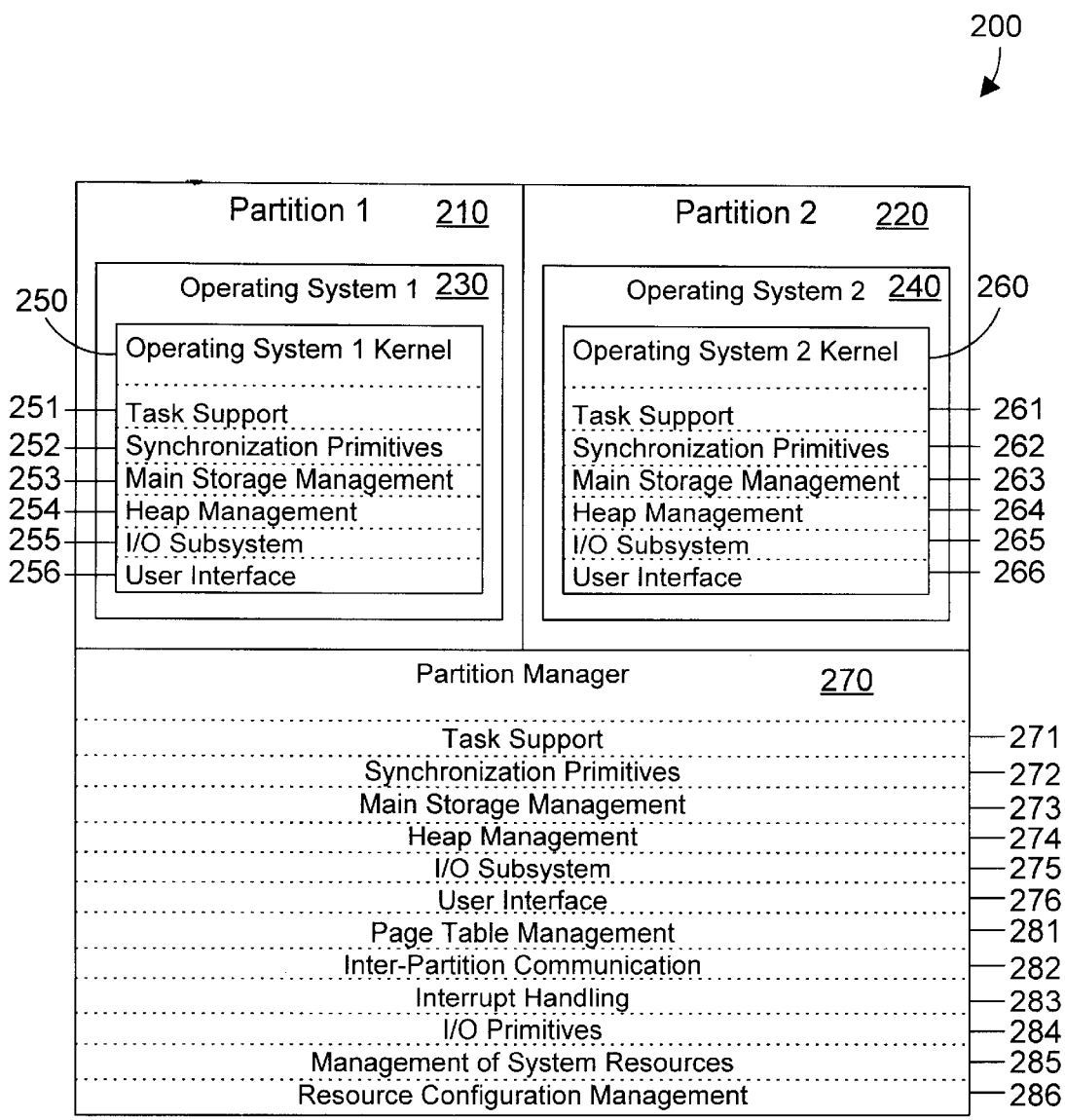
FIG. 2 is a block diagram showing a sample prior art system that has two logical partitions.

Referring to FIG. 2, a computer system 200 is shown that is partitioned into two logical partitions using prior art techniques. A partition manager 270 is used to manage two logical partitions 210 and 220. Each logical partition includes a corresponding operating system 230 and 240, and each operating system includes a kernel 250 and 260 that performs the low-level functions of the operating system. The operating system kernel 250 includes task support 251, synchronization primitives 252, main storage management 253, heap management 254, an I/O subsystem 255, and a user interface 256. In similar fashion, operating system kernel 260 includes corresponding elements 261–266 as well. These items are discussed below with reference to operating system 230, recognizing that this description for the kernel functions of operating system 230 applies to operating system 240 as well.

Task support 251 is the part of operating system 230 that manages tasks. A task is a small piece of work (also known as a "job") that needs to be performed. Task support 251 allocates system resources, as required, to perform tasks, and initiates the execution of those tasks. Synchronization primitives 252 provide support for communicating between tasks, and may include message queues, locks on shared data, and other mechanisms for communicating between tasks.

Main storage management 253 is the part of operating system 230 that manages the portion of main memory that corresponds to partition 210. Heap management 254 manages a special storage area in memory known as the "heap". A heap is storage that may be allocated and de-allocated dynamically. When operating system 230 needs memory allocated for a task, heap management 254 can allocate a portion of the heap to the task, and after the task has been performed, heap management 254 returns the used memory back to the heap.

I/O subsystem 255 is the portion of operating system 230 that controls input/output devices of a computer system. User interface 256 is an interface for a user to interact with operating system 230.

A partition manager 270 provides the low-level control of computer system 200. Partition manager 270 includes task support 271, synchronization primitives 272, main storage management 273, heap management 274, an I/O subsystem 275, and a user interface 276, which are similar to the corresponding elements 251–256 of the same names in the kernel 250 of operating system 230. The reason that partition manager 270 needs to provide these same functions is clear: when an operating system is installed in a logical partition, it no longer has complete control of the computer system, but must share control with the operating systems in other logical partitions. The low-level functions that were previously performed by the operating systems must now be performed by the partition manager, which interacts with the operating systems in the logical partitions to perform the requested functions as needed. In addition, partition manager 270 typically does not know the services provided by the operating system, or how to invoke them, so the services must be provided by the partition manager itself. For these reasons, partition manager 270 includes functions in items 271–276 that are already performed in operating system 230.

In addition to items 271–276, partition manager 270 also includes mechanisms for page table management 281, inter-partition communication 282, interrupt handling 283, I/O primitives 284, management of system resources 285, and resource configuration management 286. Page table management 281 is the mechanism that ensures each partition only accesses the portion of main memory that it owns. The logical partition must call the page table management code in order to establish addressability to a page of main memory. An inter-partition communication mechanism 282 provides for high-speed communication between logical partitions without the data having to travel outside the computer system 200. Interrupt handling 283 provides a mechanism for handling interrupts in a computer system. I/O primitives 284 provide the low-level code that drives input/output devices. Management of system resources 285 manages system-wide resources that need to be shared between logical partitions. The system clock is an example of a system resource that would be managed by the management of system resources 285. Resource configuration management 286 determines the configuration of the computer system resources for each of the logical partitions. In other words, resource configuration management 286 keeps track of resources belonging to each logical partition.

Prior art system 200 as shown in FIG. 2 includes a significant amount of code in each operating system kernel, and provides code for performing many similar functions in the partition manager 270. Providing similar functions in partition manager 270 and operating system kernel 250 means that a change to the I/O subsystem 255 of operating system kernel 250 to accommodate a new hardware bus structure will require a corresponding change to the I/O subsystem 275 of partition manager 270. Maintaining two different programs that perform such similar functions is wasteful of time and resources by duplicating the development and testing efforts for these similar functions.

Figure 3:
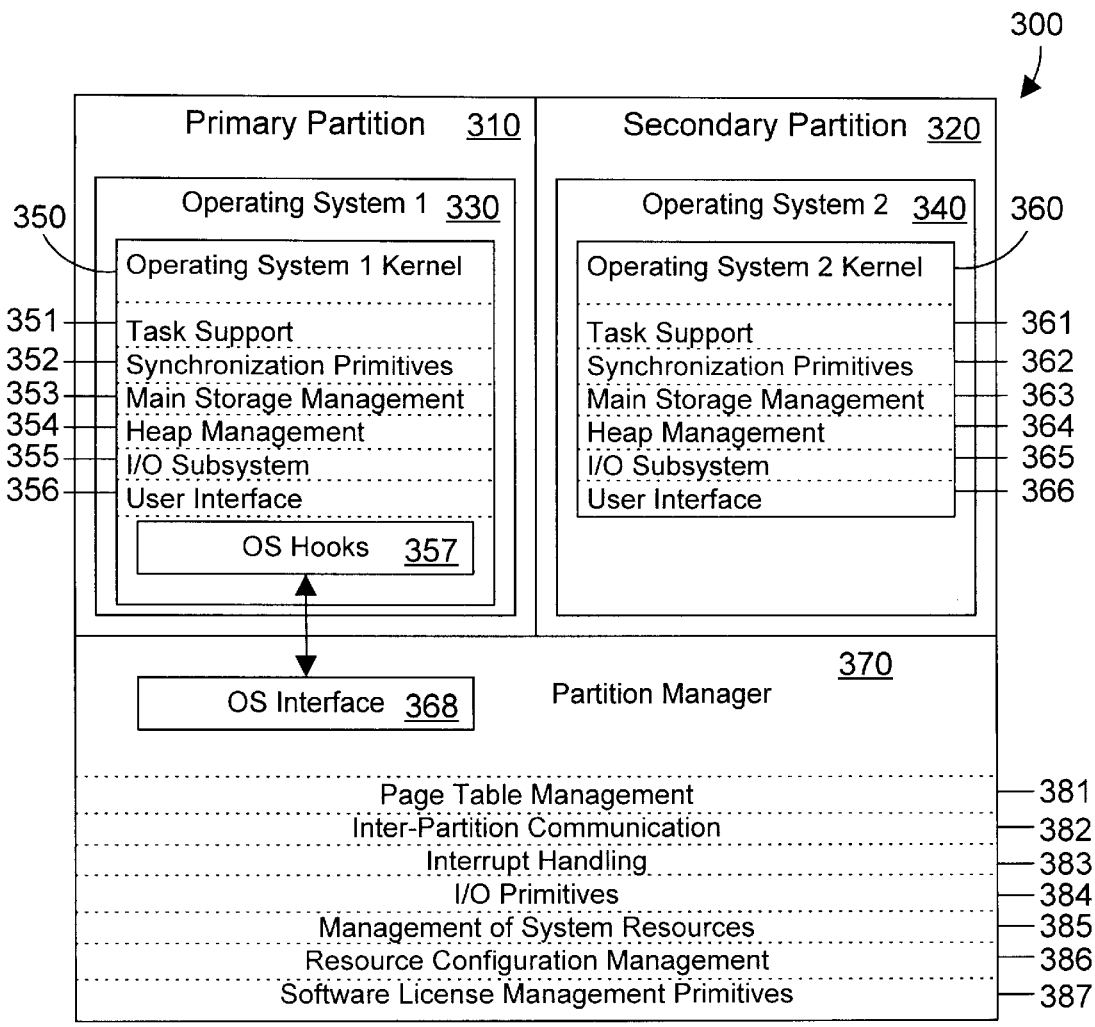
FIG. 3 is a block diagram showing a system in accordance with the preferred embodiments that has two logical partitions.

Referring now to FIG. 3, a computer system 300 in accordance with the preferred embodiments is preferably a computer system similar to 100 in FIG. 1, with the logical partitions shown in FIG. 3. A primary partition 310 provides an operating system 330 that has a kernel 350. Kernel 350 suitably includes mechanisms 351–356 that are similar to the corresponding mechanisms 251–256 shown in FIG. 2. Kernel 350 also provides operating system hooks 357 that allow a program to use functions defined in the operating system by making certain calls to the operating system via OS hooks 357. Partition 310 is referred to herein as a "primary partition" because it contains an operating system 330 that may be used by partition manager 370 to perform certain functions. All other partitions are referred to herein as "secondary partitions".

A partition manager 370 includes mechanisms 381–386 that are suitably similar to the corresponding elements 281–286 shown in FIG. 2. In addition, partition manager 370 includes software license management primitives 387 that allow partition manager 370 to track the number of users across logical partitions to enforce software licenses. Partition manager 370 also includes an operating system interface 368 that calls OS hooks 357 to perform many of the functions for the partition manager 370. Instead of providing separate code within partition manager 370 to provide task support, synchronization primitives, main storage management, heap management, I/O subsystem, and a user interface, partition manager 370 uses the mechanisms 351–356 that already reside in the kernel 350 of the operating system 330 in the primary partition 310. This approach has several advantages.

Many computer systems have operating systems that are well-defined and have been debugged over years of time. If an operating system with a reliable kernel is available, a programmer can implement a partition manager 370 by simply making calls to well-defined and tested hooks into the operating system, rather than re-implementing similar functions from scratch. Thus, by providing OS interface 368 and OS hooks 357, partition manager 370 may benefit from the functions already provided in the operating system 330. This greatly reduces the amount of programming required to implement the partition manager 370, and greatly reduces the time required to debug and test partition manager 370. The present invention thus results in substantially reducing the costs of developing a partition manager for a computer system.

Note that the kernel 350 of an operating system 330 may include many other functions not listed in FIG. 3, and may include a subset of the functions shown. The functions in the operating systems 330 and 340 of FIG. 3 are shown by way of example to illustrate some of the many possible functions that could be present in an operating system kernel. In addition, the functions 381–387 of partition manager 370 are shown as suitable examples of functions that may be implemented, and any subset of these functions, as well as other suitable functions not shown, may be implemented within partition manager 370 within the scope of the present invention. One skilled in the art will appreciate that numerous other functions could be incorporated within an operating system kernel or within a partition manager within the scope of the present invention.

Figure 4:
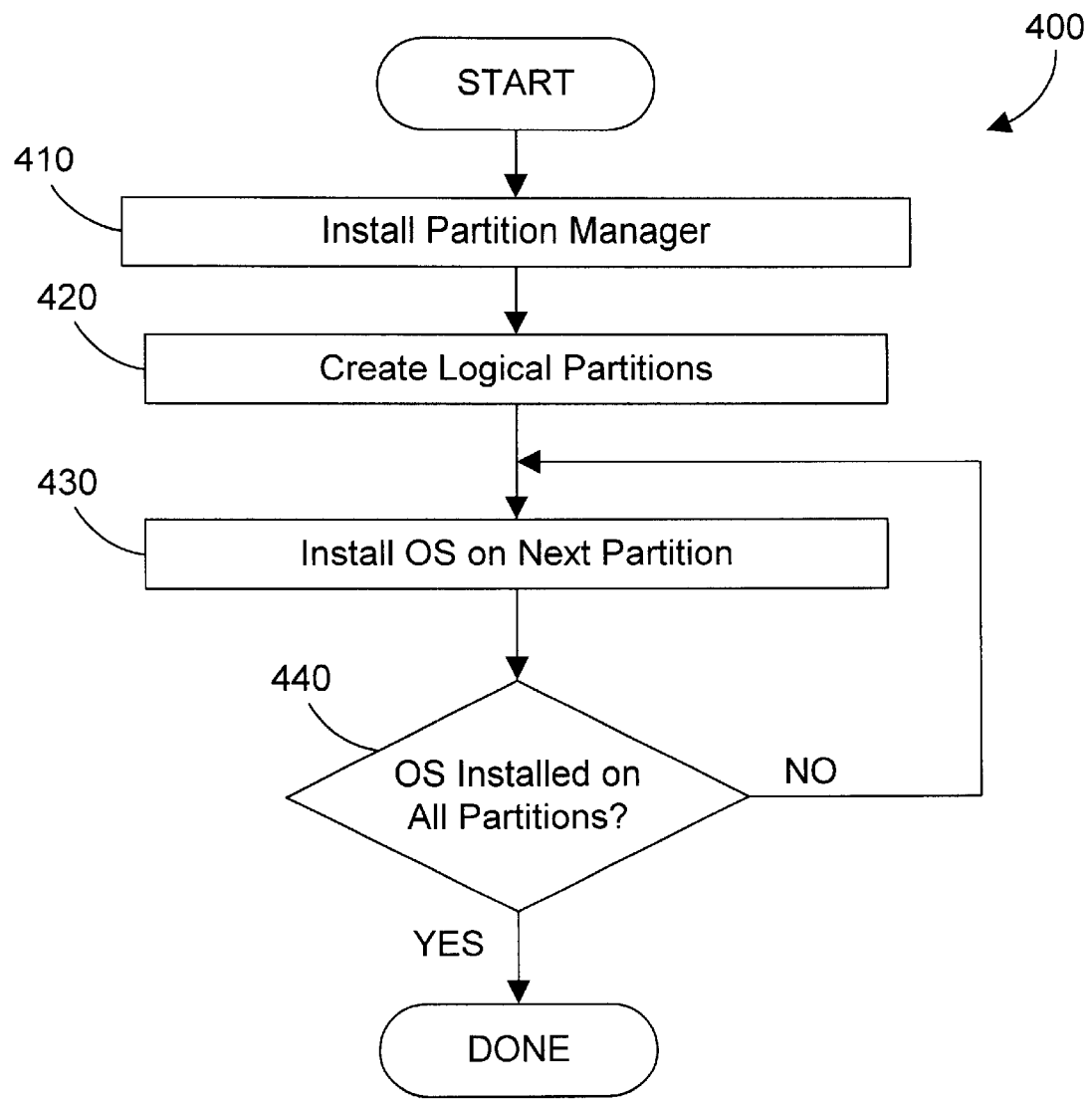
FIG. 4 is a flow diagram illustrating a known method for logically partitioning a computer system.

Because the partition manager 370 in computer system 300 of FIG. 3 uses functions provided by an operating system in the primary partition 310, the method for installing the partition manager 370 and the logical partitions 310 and 320 differs from methods known in the prior art. First, the prior art method 400 is explained with reference to FIG. 4.

In the prior art, when one or more logical partitions are desired on a computer system, first the partition manager is installed (step 410). Next, the logical partitions are created (step 420). An operating system is then installed on a partition (step 430). If an operating system has been installed on all logical partitions (step 440=YES), the installation method is complete. If there still remain logical partitions without operating systems (step 440=NO), an operating system is installed on the next logical partition (step 430), and steps 430 and 440 are repeated until an operating system has been installed on all logical partitions (step 440=YES).

Figure 5:
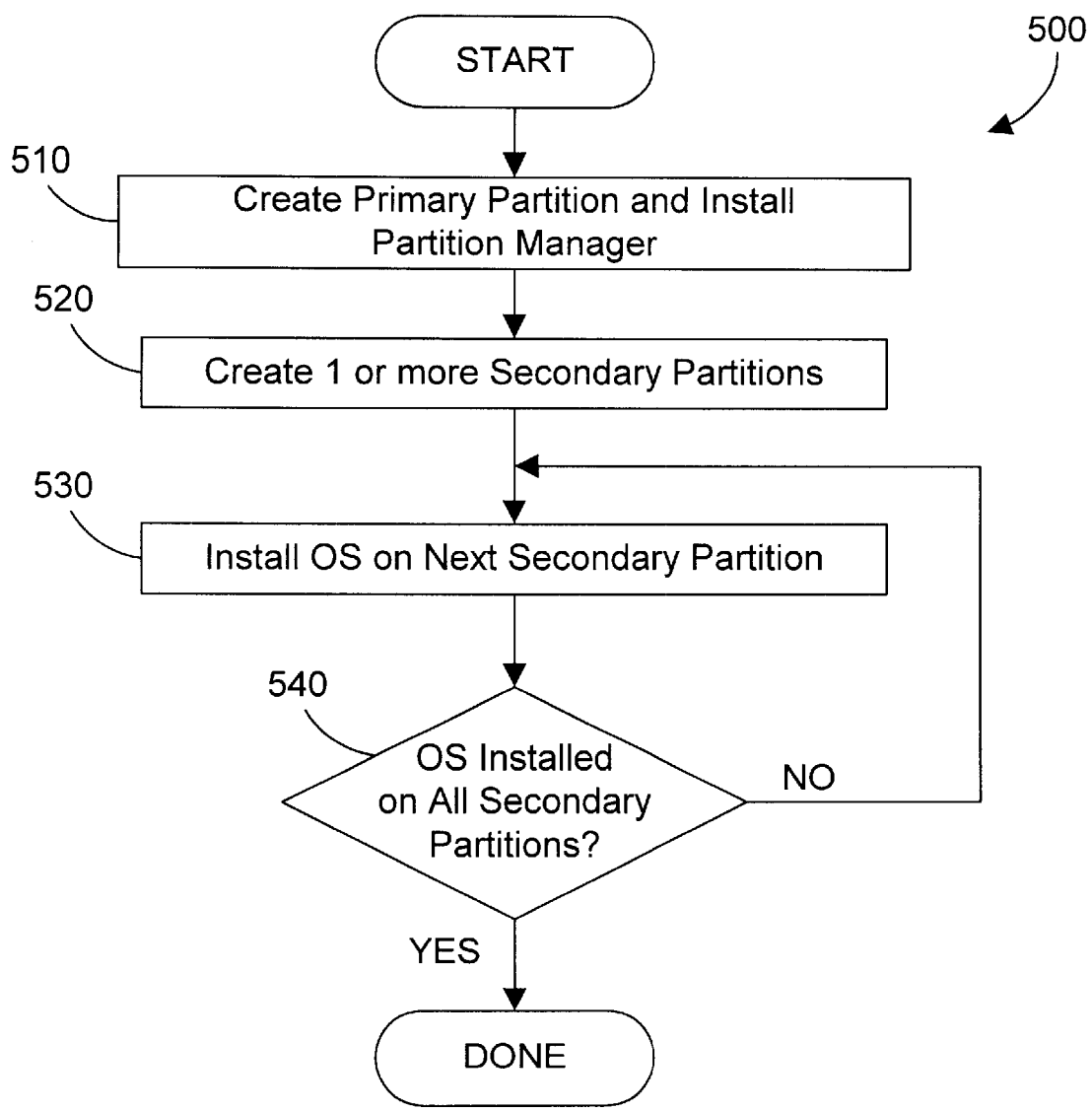
FIG. 5 is a flow diagram illustrating a method for logically partitioning a computer system in accordance with the preferred embodiments.

Referring now to FIG. 5, a method 500 for partitioning a computer system in accordance with the present invention starts by creating a primary partition and installing the partition manager (step 510). The partition manager is then used to create one or more secondary partitions (step 520). An operating system is then installed on a secondary partition (step 530). If an operating system has been installed on all secondary partitions (step 540=YES), method 500 is complete. If there remain secondary partitions without operating systems installed, steps 530 and 540 are repeated until all secondary partitions have an installed operating system (step 540=YES).

The reason that step 510 of FIG. 5 creates the primary partition and installs the partition manager is that the preferred embodiment of the invention packages partition manager 370 as part of operating system 330. Thus, the process for installing the operating system 330 will include prompts for information relating to partition manager 370 as well. This means that a software installer may use the same familiar interface for the operating system to install both the operating system and the partition manager 370. Note that installing the same operating system on the secondary partition 320 will include the partition manager code, but this code will not be used because it resides in a secondary partition.

The present invention as described above comprises a partition manager that uses functions provided by an operating system residing in a logical partition. By using existing code in the operating system to perform these low-level functions, duplication of code is prevented, and code maintenance is greatly improved. In addition, the user interface and procedures for maintaining the partition manager are the same as used to maintain the operating system in the primary partition, greatly simplifying the maintenance of the partition manager of the present invention when compared with maintaining known partition managers.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:

at least one processor;

a memory coupled to the at least one processor;

a plurality of logical partitions defined on the apparatus, each logical partition including an operating system and a portion of the at least one processor and a portion of the memory; and a partition manager for managing the use of computer system resources by the plurality of logical partitions, the partition manager including at least one call to a kernel of the operating system residing in a preselected one of the logical partitions, the call resulting in the execution of a plurality of instructions in the kernel by the partition manager to perform at least one kernel function for the partition manager.

2. The apparatus of claim 1 wherein the operating system kernel in the preselected logical partition includes hooks that may be called by the at least one call of the partition manager.

3. The apparatus of claim 1 wherein the at least one kernel function comprises task support functions and synchronization primitives.

4. The apparatus of claim 3 wherein the at least one kernel function further comprises main storage management functions and heap management functions.

5. The apparatus of claim 4 wherein the at least one kernel function further comprises an input/output (I/O) subsystem.

6. The apparatus of claim 5 wherein the at least one kernel function further comprises a user interface.

7. The apparatus of claim 6 wherein the partition manager provides software license management primitives for tracking a total number of users across the plurality of partitions.

8. The apparatus of claim 1 wherein the at least one kernel function comprises main storage management functions and heap management functions.

9. The apparatus of claim 1 wherein the at least one kernel function comprises an input/output (I/O) subsystem.

10. The apparatus of claim 1 wherein the at least one kernel function comprises a user interface.

11. The apparatus of claim 1 wherein the partition manager provides software license management primitives for tracking a total number of users across the plurality of partitions.

12. An apparatus comprising:

at least one processor;

a memory coupled to the at least one processor;

a plurality of logical partitions defined on the apparatus, each logical partition including an operating system and a portion of the at least one processor and a portion of the memory; and partition manager means for managing the use of computer system resources by the plurality of partitions, the means including at least one call to a kernel of the operating system residing in a preselected one of the logical partitions, the call resulting in the execution of a plurality of instructions in the kernel by the partition manager to perform at least one kernel function for the partition manager.

13. A computer-implemented method for creating at least one logical partition on a computer system, the method comprising the steps of:

(A) creating a first logical partition;

(B) installing a partition manager for managing the use of computer system resources by the at least one logical partition, the partition manager including at least one call to a kernel of an operating system that will be installed in the first logical partition, the call resulting in the execution of a plurality of instructions in the kernel by the partition manager to perform at least one kernel function for the partition manager; and (C) installing the operating system in the first logical partition.

14. The method of claim 13 further comprising the steps of:

(D) creating another logical partition;

(E) installing an operating system in the logical partition created in step (D); and (F) repeating steps (D) and (E) until the desired number of logical partitions have been created on the computer system.

15. A computer-implemented method for managing resources on a computer system that has a plurality of logical partitions, the method comprising the steps of:

providing a partition manager that includes at least one call to a kernel of an operating system in a pre-defined logical partition, the call resulting in the execution of a plurality of instructions in the kernel by the partition manager to perform at least one kernel function for the partition manager; and executing the partition manager to manage the resources in the plurality of logical partitions, the partition manager performing the at least one call to the operating system kernel.

16. A program product comprising:

a partition manager for managing the use of computer system resources by a plurality of logical partitions, the partition manager including at least one call to a kernel of an operating system residing in a preselected one of the logical partitions, the call resulting in the execution of a plurality of instructions in the kernel by the partition manager to perform at least one kernel function for the partition manager; and computer-readable signal bearing media bearing the partition manager.

17. The program product of claim 16 wherein the signal bearing media comprises recordable media.

18. The program product of claim 16 wherein the signal bearing media comprises transmission media.

19. The program product of claim 16 wherein the at least one kernel function comprises task support functions and synchronization primitives.

20. The program product of claim 19 wherein the at least one kernel function further comprises main storage management functions and heap management functions.

21. The program product of claim 20 wherein the at least one kernel function further comprises an input/output (I/O) subsystem.

22. The program product of claim 21 wherein the at least one kernel function further comprises a user interface.

23. The program product of claim 22 wherein the partition manager provides software license management primitives for tracking a total number of users across the plurality of partitions.

24. The program product of claim 16 wherein the at least one kernel function comprises main storage management functions and heap management functions.

25. The program product of claim 16 wherein the at least one kernel function comprises an input/output (I/O) subsystem.

26. The program product of claim 16 wherein the at least one kernel function comprises a user interface.

27. The program product of claim 16 wherein the partition manager provides software license management primitives for tracking a total number of users across the plurality of partitions.

* * * * *